(12) United States Patent
Sasagawa

(10) Patent No.: US 8,892,230 B2
(45) Date of Patent: *Nov. 18, 2014

(54) MULTICORE SYSTEM, CONTROL METHOD OF MULTICORE SYSTEM, AND NON-TRANSITORY READABLE MEDIUM STORING PROGRAM

(75) Inventor: Kentaro Sasagawa, Tokyo (JP)

(73) Assignee: NEC Corporation, Tokyo (JP)

( * ) Notice: Subject to any disclaimer, the term of this patent is extended or adjusted under 35 U.S.C. 154(b) by 240 days.

This patent is subject to a terminal disclaimer.

(21) Appl. No.: 13/502,601

(22) PCT Filed: Aug. 4, 2010

(86) PCT No.: PCT/JP2010/004911
§ 371 (c)(1),
(2), (4) Date: Apr. 18, 2012

(87) PCT Pub. No.: WO2011/061878
PCT Pub. Date: May 26, 2011

(65) Prior Publication Data
US 2012/0221134 A1     Aug. 30, 2012

(30) Foreign Application Priority Data

Nov. 18, 2009   (JP) ................................ 2009-262545

(51) Int. Cl.
| | | |
|---|---|---|
| G06F 17/00 | (2006.01) | |
| G11B 27/034 | (2006.01) | |
| G06F 13/28 | (2006.01) | |
| G06F 11/20 | (2006.01) | |
| G11B 20/10 | (2006.01) | |

(52) U.S. Cl.
CPC ........ G06F 11/2038 (2013.01); *G06F 11/2033* (2013.01); *G11B 2020/1062* (2013.01);
(Continued)

(58) Field of Classification Search
CPC ............................ H04M 3/561; G11B 27/034

USPC ............... 386/248, 244; 700/94; 701/209; 710/301, 15, 22, 56; 714/3; 345/467; 370/263; 704/258; 709/207; 715/716; 717/100; 718/102
See application file for complete search history.

(56) References Cited

U.S. PATENT DOCUMENTS 5,357,511 A * 10/1994 DiNapoli et al. ............. 370/263
5,850,628 A * 12/1998 Jeffway, Jr. .................. 704/258
(Continued)

FOREIGN PATENT DOCUMENTS

| CN | 101241589 | 8/2008 |
| CN | 101303687 | 11/2008 |

(Continued)

OTHER PUBLICATIONS

International Search Report, PCT/JP2010/004911, Sep. 7, 2010.
(Continued)

*Primary Examiner* — Gerald Gauthier
(74) *Attorney, Agent, or Firm* — Young & Thompson

(57) ABSTRACT

A multicore system 2 includes a main system program 610 that operates on a first processor core 61 and stores synthesized audio data, which is mixed audio data, to a buffer for DMA transfer 63, a standby program 620 that operates on a second processor 62, and an audio output unit 64 that sequentially stores the synthesized audio data transferred from the buffer for DMA transfer 63 and plays the stored synthesized audio data. When an amount of storage of the synthesized audio data stored to the buffer for DMA transfer 63 has not reached a predetermined amount of data determined according to the amount of storage of the synthesized audio data stored to the audio output unit 64, the standby system program 620 takes over and executes the mixing and the storage of the synthesized audio data that is executed by the main system program 610.

15 Claims, 11 Drawing Sheets

(52) U.S. Cl.
CPC ... *G11B 2020/10638* (2013.01); *G11B 27/034* (2013.01); *G11B 2020/1074* (2013.01); *G06F 11/2043* (2013.01); *G11B 20/10527* (2013.01); *G06F 13/28* (2013.01); *G11B 2020/10814* (2013.01); *G11B 2020/10675* (2013.01); *G06F 11/2028* (2013.01)

USPC ............ 700/94; 345/467; 370/263; 386/244; 386/248; 386/354; 704/258; 709/207; 710/15; 710/22; 710/56; 710/301; 714/3; 715/716; 717/100; 718/102

(56) References Cited

U.S. PATENT DOCUMENTS

| | | | |
|---|---|---|---|
| 5,995,751 A * | 11/1999 | Kosugi et al. | 717/100 |
| 6,297,797 B1 * | 10/2001 | Takeuchi et al. | 345/467 |
| 7,603,505 B2 * | 10/2009 | Stucke et al. | 710/301 |
| 7,639,924 B2 * | 12/2009 | Roelens | 386/354 |
| 7,725,897 B2 | 5/2010 | Hamaoka | |
| 7,774,512 B2 * | 8/2010 | Suzuoki | 710/22 |
| 7,814,166 B2 * | 10/2010 | Suzuoki | 709/207 |
| 8,006,385 B2 | 8/2011 | Mataga | |
| 8,037,221 B2 * | 10/2011 | Norgaard et al. | 710/56 |
| 8,321,601 B2 * | 11/2012 | Marriott et al. | 710/15 |
| 8,396,351 B2 * | 3/2013 | Ebato | 386/248 |
| 8,437,612 B2 * | 5/2013 | Jung et al. | 386/244 |
| 8,621,350 B2 * | 12/2013 | Nathan et al. | 715/716 |
| 2006/0112390 A1 | 5/2006 | Hamaoka | |
| 2007/0096867 A1 | 5/2007 | Denison et al. | |
| 2009/0154839 A1 | 6/2009 | Eckert et al. | |
| 2009/0248300 A1 * | 10/2009 | Dunko et al. | 701/209 |
| 2012/0137163 A1 * | 5/2012 | Sasagawa | 714/3 |
| 2012/0204183 A1 * | 8/2012 | Bayer et al. | 718/102 |
| 2012/0221134 A1 * | 8/2012 | Sasagawa | 700/94 |

FOREIGN PATENT DOCUMENTS

| | | |
|---|---|---|
| JP | 2006-035386 | 2/2006 |
| JP | 2006-085386 | 3/2006 |
| JP | 2006-146937 | 6/2006 |
| JP | 2009-190103 | 8/2009 |
| JP | 2011-043892 | 3/2011 |

OTHER PUBLICATIONS

JP Office Action dated Jun. 11, 2013, with English translation; Application No. 2011-541787.
Chinese Official Action—201080052247.8—May 8, 2014.

* cited by examiner

| NO. OF FIFO BOUNDARY INTERRUPT | THRESHOLD | TIME WHEN FIFO BOUNDARY INTERRUPT IS GENERATED |
|---|---|---|
| 1ST (FIFO REMAINING 56 SAMPLES) | — | 150 μs |
| 2ND (FIFO REMAINING 48 SAMPLES) | — | 300 μs |
| 3RD (FIFO REMAINING 40 SAMPLES) | 128 | 450 μs |
| 4TH (FIFO REMAINING 32 SAMPLES) | 352 | 600 μs |
| 5TH (FIFO REMAINING 24 SAMPLES) | 576 | 750 μs |
| 6TH (FIFO REMAINING 16 SAMPLES) | 800 | 900 μs |
| 7TH (FIFO REMAINING 8 SAMPLES) | 1024 | 1050 μs |

Fig. 4

MULTICORE SYSTEM, CONTROL METHOD OF MULTICORE SYSTEM, AND NON-TRANSITORY READABLE MEDIUM STORING PROGRAM

TECHNICAL FIELD

The present invention relates to a multicore system, a control method of the multicore system, and a non-transitory readable medium storing a program.

BACKGROUND ART

A processor (MPU: Micro Processing Unit) including a plurality of CPU (Central Processing Unit) cores for embedding usage that is composed of a multicore has been developed. These processors are formed in one chip including peripheral devices. A technique of operating several different OSs (Operating System) on a multicore CPU is known. Further, a means to notify a single interrupt request (IRQ: Interrupt ReQuest) to a plurality of CPU cores is known as a function of an MPU. Furthermore, the MPU can be configured to assign which interrupt request to which CPU core according to register setting.

Additionally, for example, as shown in FIG. 8, a technique of transferring audio data via an I2S (Inter-IC Sound) bus from a CPU inside a MPU 50 to an ADAC (Audio DAC) 51 is known. The audio data is PCM (Pulse Code Modulation) audio, for example. Note that I2S is a serial communication format manufactured by PHILIPS (registered trademark) which forms an interface device of the audio data. In the I2S standard, PCM audio and compressed audio (such as μ-law and ADPCM) can be output to the ADAC 51 via the I2S bus. Moreover, in FIG. 8, the I2C (Inter-Integrated Circuit) bus is a serial bus for device control developed by PHILIPS (registered trademark). The ADAC 51 converts the audio data into stereo audio. A DAC is a D/A Converter. Analog audio (stereo) output from the ADAC 51 is played via a speaker.

In addition, an I2S device including a FIFO (First In First Out) buffer is known. Such an I2C device dequeues audio data stored to the FIFO buffer and outputs it to an ADAC via an I2S bus. Then, when the size of data, which is dequeued from the FIFO buffer and reduced, reaches boundaries such as 4, 8, 16, and 32 bytes, there is the IS2 device that can generate an interrupt (hereinafter referred to as a "FIFO boundary interrupt"). Generally, this interrupt is used for PIO (Programmed Input/Output) transfer.

SUMMARY OF INVENTION

Technical Problem

An applicant of the present invention discloses the technique for operating a plurality of OSs on a single multicore CPU in previously filed Japanese Patent Application No. 2009-190103. When the I2C device is shared among these plurality of OSs, even when the OS that controls the I2C device is disabled due to a kernel panic, freeze or the like, this technique enables other OS to control the I2C device. This prevents sound skipping by a simple configuration.

Here, the technique disclosed in Japanese Patent Application No. 2009-190103 is explained with reference to FIGS. 9A and 9B. FIG. 9A shows audio data and a flow of a process. An OS of a main system side operates with a DMA transfer completion interrupt as a trigger and performs an audio mixing process of the audio data and a DMA transfer request process. Then, the audio data after the audio mixing process is DMA-transferred to the FIFO.

However, when the OS of the main system side is disabled, the DMA transfer request process will not be performed within certain time. Therefore, an I2S under-run error is generated. Accordingly, when a DMA transfer interval (indicating the time from the generation of the DMA transfer completion interrupt until the generation of the I2S under-run error) exceeds the certain time, the FIFO becomes empty and sound skipping is generated.

Therefore, in this technique, after the DMA transfer of the audio data to the FIFO included in the I2S device is performed, a plurality of OSs receive a DMA (direct Memory Access) transfer interrupt. The OS of the standby side operates with the DMA transfer completion interrupt as a trigger, and sets a HW (Hard Ware) timer. Further, the OS of the main system side performs the audio mixing process of the audio data and the DMA transfer request process, and cancels the HW timer. Accordingly, it is possible to detect that the OS of the main system side is disabled by time-out of the HW timer. Then, when the HW timer times out, it indicates that the OS of the main system side is disabled. Therefore, switching is made from the OS of the main system side to the OS of the standby system side, and the audio mixing process and the DMA transfer request process are continued. This prevents from emptying the FIFO buffer and generating sound skipping.

As described so far, in this technique, the OS of the standby system side that detected that the OS of the main system side is disabled continues the audio mixing process or the like in place of the OS of the main system side. Moreover, this technique enables a processing method of a DMA transfer interrupt thread for performing the audio mixing process etc. in order not to generate the I2S under-run error to be selected according to the reception of the DMA transfer completion interrupt.

Specifically, one of the processing methods of the pattern A and B is to be selected depending on the length of the audio mixing process time and the DMA transfer interval (≈I2S under-run error generation time). Note that the audio mixing process time and the DMA transfer interval can be calculated from the specifications of the implementing environment. The specifications of the implementing environment is, for example, the number of the FIFO buffer stages, an audio sampling frequency, a DMA transfer size, and a CPU clock of the I2S device.

A selection condition of the pattern A and B is explained with reference to FIG. 9B. FIG. 9B shows a relationship between the audio mixing process time and the I2S under-run error generation time under the selection condition of the patterns A and B.

When the selection condition "DMA transfer interval> (audio mixing process time×2)" is satisfied, the pattern A is selected. The pattern A performs the DMA transfer start request process following the audio mixing process. That is, when this condition is satisfied, it is switched to the OS of the standby system without canceling the HW timer after the audio mixing process by the OS of the main system, and even when the DMA transfer is started after the OS of the standby system performs the audio mixing process, the DMA transfer can be performed before the I2S under-run error generation time elapses.

When the selection condition "DMA transfer interval (audio mixing process time×2)" is satisfied, the pattern B is selected. The pattern B performs the audio mixing process following the DMA transfer start request process. That is, when this condition is satisfied, it is switched to the OS of the standby system without canceling the HW timer after the audio mixing process by the OS of the main system, and when the DMA transfer is started after the OS of the standby system performs the audio mixing process, the DMA transfer is performed after the I2S under-run error generation time elapses.

When the pattern B is met, the DMA transfer start request process is performed before the audio mixing process. Therefore, as shown in FIG. 10, the audio data is pre-read by one packet (DMA transfer size) and prepared. Specifically, the audio data is double-buffered. However, in the pattern B, the audio data is pre-read by one packet. Therefore, there is a problem that when video is played by a video player that performs picture-sound synchronization, there is one packet gap between the audio data actually being played and the audio data recognized to be being played by a video player, and the accuracy of the picture-sound synchronization decreases.

Here, this problem is explained in more detail with reference to FIG. 11. FIG. 11 illustrates a case when the OS of the main system side is an OS 72, and the OS of the standby system side is an OS 71. The OS 71 includes a mixed counter 712. The OS 72 includes a mixed counter 722. First, an application program 721 (abbreviated as "APP" in the drawings) that operates on the OS 72 of the main system side enqueues the audio data to a sound queue 82. The application program 721 plays, for example, the video including 16-bit stereo audio of a sampling frequency of 48,000 Hz. Further, the application program 721 transmits the audio data in a unit of 4096 bytes at intervals of (1024/48000) seconds, for example.

An application program 711 (abbreviated as "APP" in the drawings) that operates on the OS 72 of the standby system side enqueues the audio data to a sound queue 81. Then, a software mixer 723 that operates on the OS 72 of the main system side mixes the audio data dequeued from the sound queues 81 and 82. The software mixer 723 stores the mixed audio data to a buffer for DMA transfer 73 as the audio data for DMA transfer. The audio data stored to the buffer for DMA transfer 73 is transferred to a FIFO 74 of the I2S device. Then, the audio data dequeued from the FIFO 74 is played by an ADAC 75.

As mentioned so far, the software mixer 723 converts the audio data of different sampling frequencies and quantization bit rates output from a plurality of application programs into single piece of the audio data. Moreover, every time the audio data is mixed, the software mixer 723 counts up a counter value of a mixed sample number counter 722 for the number of samples of the audio data that is mixed and generated.

The application program 721 that operates on the OS 72 of the main system side performs calculation of a transmission interval and the picture-sound synchronization of the audio data by referring to the counter value of the mixed sample number counter 722. That is, the application program 721 plays the image corresponding to the number of samples of the mixed audio data when the picture-sound synchronization is performed and the video is played. Accordingly, in the processing method that pre-reads the audio data by one packet and performs mixing as in the pattern B, there is a large gap between the image played and the audio actually output, and the accuracy of the picture-sound synchronization decreases.

In order to solve the abovementioned problem, a purpose of the present invention is to provide a multicore system, a control method of the multicore system, and a program that can prevent generation of sound skipping while suppressing the decrease of the accuracy of the picture-sound synchronization.

Solution to Problem

In a first exemplary aspect of the present invention, a multicore system includes a main system program that operates on a first processor core, mixes first and second audio data, and stores the mixed synthesized audio data to a buffer for DMA transfer, a standby system program that operates on a second processor core and operates as a standby system of the main system program, and an audio output means that sequentially stores the synthesized audio data transferred from the buffer for DMA transfer and plays the stored synthesized audio data, in which when an amount of storage of the synthesized audio data stored to the buffer for DMA transfer has not reached a predetermined amount of data determined according to the amount of storage of the synthesized audio data stored to the audio output means, the standby system program takes over and executes the mixing and the storage of the synthesized audio data executed by the main system program.

In a second exemplary aspect of the present invention, a control method of a multicore system includes steps of mixing, by a main system program that operates on a first processor core, first and second audio data and storing the mixed synthesized audio data to a buffer for DMA transfer, sequentially storing, by an audio output means, the synthesized audio data transferred from the buffer for DMA transfer and playing the stored synthesized audio data, evaluating, by a standby system program that operates on a second processor core and operates as a standby system of the main system program, whether or not an amount of storage of the synthesized audio data stored to the buffer for DMA transfer reaches a predetermined amount of data determined according to the amount of storage of the synthesized audio data stored to the audio output means, and when it is evaluated that the predetermined amount of data is reached, taking over and executing, by the standby system program, the mixing and the storage of the synthesized audio data executed by the main system program.

In a third exemplary embodiment of the present invention, a non-transitory readable medium storing a program that operates as a standby system of a main system program on a processor core that is different from the main system program and causes the processor core to execute a step of evaluating whether an amount of storage of synthesized audio data that is stored to a buffer for DMA transfer reaches a predetermined amount of data determined according to an amount of storage of the synthesized audio data stored to an audio output means, in which the synthesized audio data is transferred to an audio output means and is obtained by the main system program mixing first and second audio data, the audio output means sequentially stores the synthesized audio data that is transferred and plays the stored synthesized data, and the buffer for DMA transfer stores the synthesized audio data, and a step of taking over and executing the mixing and the storage of the synthesized audio data executed by the main system program when it is evaluated that the predetermined amount of data is reached.

Advantageous Effects of Invention

By each of the abovementioned exemplary aspect of the present invention, it is possible to provide a multicore system, a control method of the multicore system, and a program that can prevent generation of sound skipping while suppressing the decrease in the accuracy of the picture-sound synchronization.

BRIEF DESCRIPTION OF DRAWINGS

FIG. 4 is a view showing a relationship between the number of times of FIFO boundary interrupts and thresholds according to the exemplary embodiment of the present invention;

DESCRIPTION OF EMBODIMENTS

Figure 1:
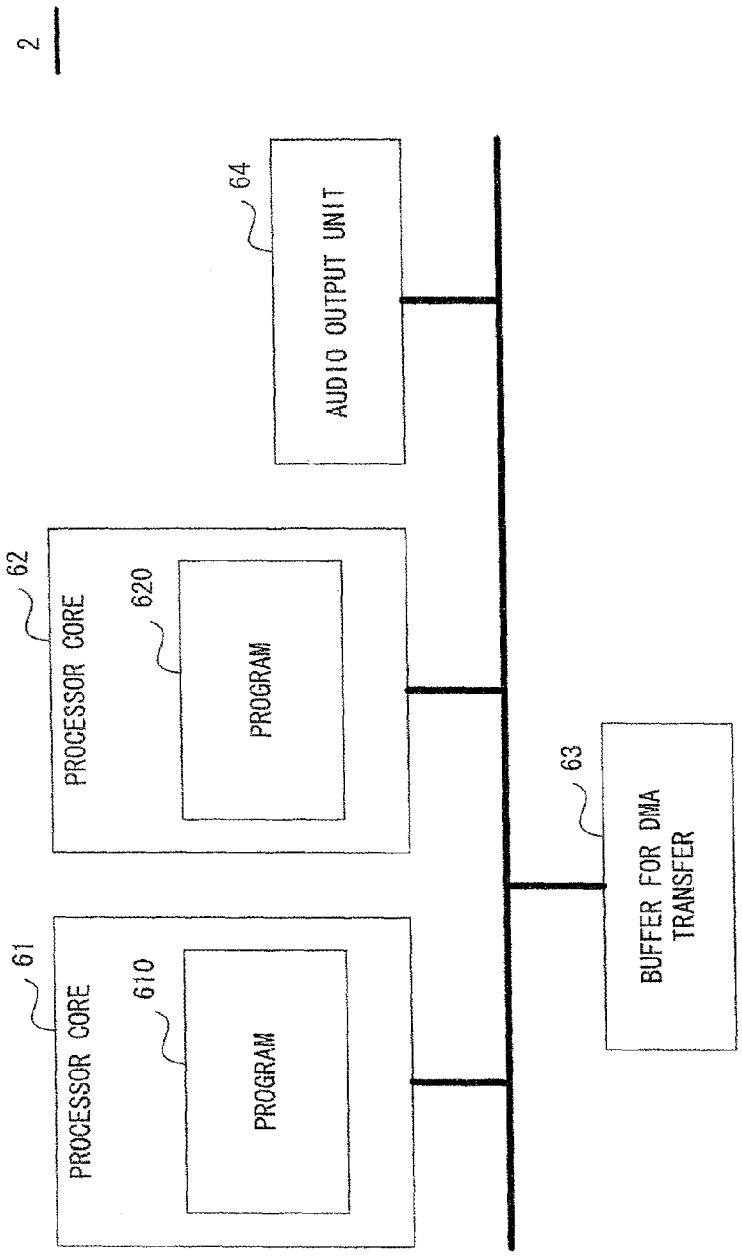
FIG. 1 is a block diagram showing an outline of a hardware configuration of a multicore system according to an exemplary embodiment of the present invention.

First, an outline of a multicore system according to an exemplary embodiment of the present invention is explained with reference to FIG. 1. FIG. 1 is a block diagram showing an outline of a hardware configuration of the multicore system according to this exemplary embodiment.

A multicore system 2 includes processor cores 61 and 62, a buffer for DMA transfer 63, and an audio output unit 64.

The processor core 61 operates a program 610 that operates as a main system.

The processor core 62 operates a program 620 that operates as a standby system.

The buffer for DMA transfer 63 stores synthesized audio data, which is mixed by the programs 61 and 62.

The audio output unit 64 sequentially stores the synthesized audio data transferred from the buffer for DMA transfer 63 and plays the stored synthesized audio data.

The program 610 mixes first and second audio data and stores the mixed synthesized audio data to the buffer for DMA transfer 63. The program 61 is a program that operates as the main system.

The program 620 operates as the standby system of the main system program.

Next, the outline of the process of the multicore system according to the exemplary embodiment of the present invention is explained.

The program 610 of the main system mixes the first and second audio data and stores the mixed synthesized audio data to the buffer for DMA transfer 63. Then, when the synthesized audio data stored to the buffer for DMA transfer 63 reaches a certain data amount, the synthesized audio data stored to the buffer for DMA transfer 63 is transferred to the audio output unit 64. The audio output unit 64 sequentially stores the synthesized audio data transferred from the buffer for DMA transfer 63 and plays the stored synthesized audio data.

The program 620 of the standby system evaluates whether or not an amount of storage of the synthesized audio data stored to the buffer for DMA transfer 63 reached a predetermined amount of data which is determined according to the amount of storage of the synthesized audio data stored to the audio output unit 64. Then, when the predetermined data amount has not been reached, it takes over and executes the mixing and the storage of the synthesized audio data executed by the main program 610.

Figure 2:
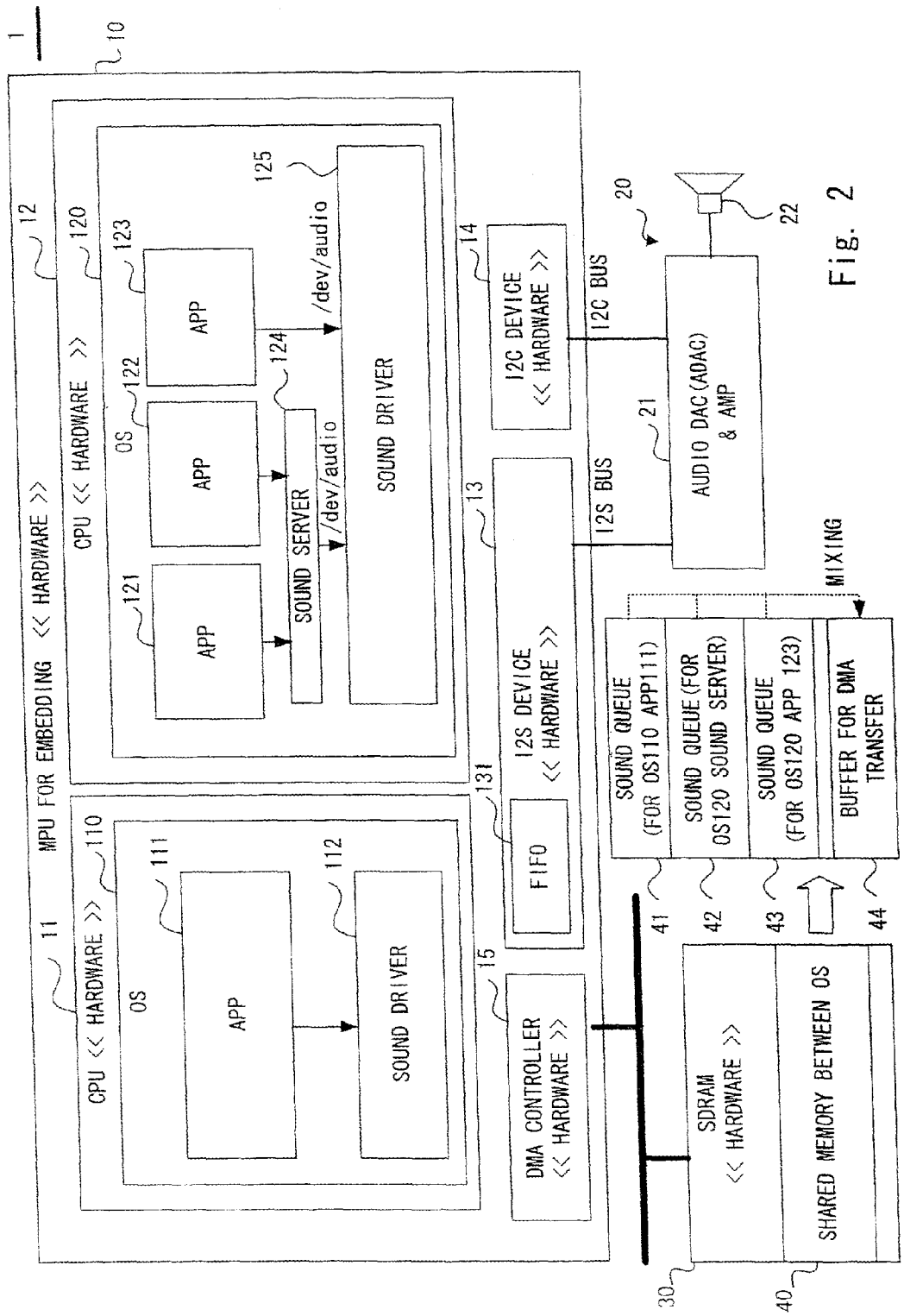
FIG. 2 is a block diagram showing an outline of the hardware configuration of the multicore system according to the exemplary embodiment of the present invention.

Next, the multicore system according to the exemplary embodiment of the present invention is explained with reference to FIGS. 2 and 3. FIG. 2 is a block diagram showing the hardware configuration of the multicore system according to this exemplary embodiment.

As shown in FIG. 2, the multicore system 1 includes an MPU 10 for embedding, an audio output device 20, and an SDRAM (Synchronous Dynamic Random Access Memory) 30. The SDRAM functions as an external shared memory.

The MPU 10 is an IC (Integrated Circuit) that integrates a multicore CPU and peripheral devices (I2S device 13, I2C device 14, and DMAC 15) on one chip. CPUs 11 and 12 each include one or a plurality of CPU cores. For example, among multicore CPUs including four CPU cores, the CPU 11 includes one CPU core and the CPU 12 includes three CPU cores. Further, the CPUs 11 and 12 may be composed of a plurality of multicore CPUs. The CPU core is equivalent to the processor cores 61 and 62.

The MPU 10 operates a plurality of OSs on the multicore CPU. An OS 110 operates on the CPU 11. An OS 120 operates on the CPU 12. Note that the OS 110 and OS 120 are different kinds of OSs. For example, there can be a combination in which the OS 110 is a real-time OS such as µITRON and the OS 120 is a highly-functional embedded OS. The highly-functional embedded OS is, for example, embedded Linux (registered trademark) and Windows CE (registered trademark), etc.

An application program 111 (abbreviated as "APP" in the drawings) and a sound driver 112, which is a device driver, operate on the OS 110. The audio data output from the application program 111 is input to the sound driver 112. Further, application programs 121, 122, and 123 (each abbreviated as "APP" in the drawings), a sound server 124, and a sound driver 125, which is a device driver, operate on the OS 120. The audio data output from the application program 121 and the application program 122 is input to the sound server 124. The audio data output from the sound server 124 and the audio data output from the application program 123 is input to the sound driver 125.

The I2S device 13 transmits the audio data to an ADAC& 21 via an I2S bus (I2S bus). The I2S device 13 is one device. The I2S device 13 includes a FIFO 131. The I2S device 13 stores the audio data to the FIFO 131. Here, the I2S device 13 handles stereo PCM as the audio data.

The I2C device 14 is a serial bus for device control. The I2C device 14 is used in order to perform reading and writing from and to a register included in the ADAC.

The DMAC (DMA Contoroller) 15 controls DMA transfer between the SDARM 30 connected outside the MPU 10 and other devices. Here, transfer of the audio data from a shared memory between OSs 40 on the SDRAM 30 to the FIFO 131 of the I2S device 13 is performed using one channel of the DMAC 15.

Note that in this exemplary embodiment, it is explained that normally the sound driver 125 of the OS 120 side performs the audio mixing process and the control of the peripheral devices (I2S device 13, I2C device 14, and DMAC 15).

The audio output device 20 includes an ADAC& 21 and a speaker 22. The ADAC& 21 composes an external interface of the audio output device 20. The ADAC& 21 converts the audio data transmitted via the I2S bus into an analog signal and amplifies it. The ADAC& 21 plays the analog signal using the speaker 22. The I2S device 13 and the audio output unit 20 are equivalent to the audio output unit 64.

The SDRAM 30 is a volatile memory (RAM) connected outside the MPU 10 via a bus. A memory space shared between OSs of the MPU 10 as the shared memory between OSs 40 is ensured in the SDRAM 30.

In the shared memory between OSs 40, sound queues (sound queue 41, sound queue 42, and sound queue 43) and a buffer for DMA transfer 44 are set. The sound queue is a ring buffer that stores the audio data output by the application program. Queues corresponding to the number of application programs for outputting the audio data are created as the sound queues. Here, three sound queues (sound queue 41, sound queue 42, and sound queue 43) corresponding the application program 111 of the OS 110, the sound server 124 of the OS 120, and the application program 123 of the OS 120 are created. The audio data of the sound queues (sound queue 41, sound queue 42, and sound queue 43) is performed with the audio mixing process, and then stored to the buffer for DMA transfer 44. Note that the sound queue may be composed using a queuing means other than the ring buffer.

Figure 3:
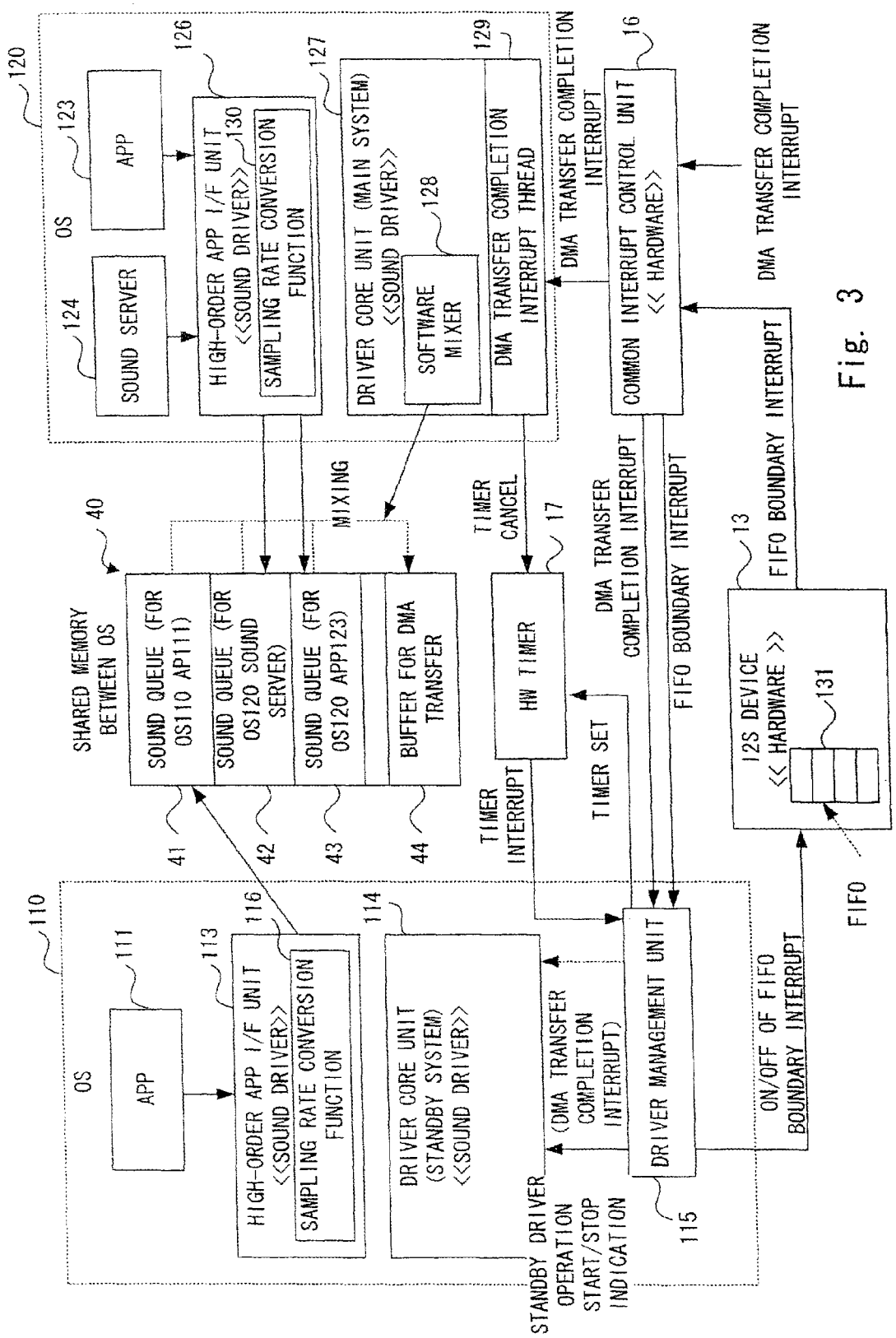
FIG. 3 is a block diagram showing a functional configuration of the multicore system according to the exemplary embodiment of the present invention.

FIG. 3 is a block diagram showing the functional configuration of the multicore system according to this exemplary embodiment. FIG. 3 shows that the sound driver 112 shown in FIG. 2 is divided into a high-order application I/F unit 113 and a driver core unit 114. Further, it is shown that the sound driver 125 is divided into a high-order application I/F unit 126 and a driver core unit 127. The high-order application I/F unit 113 includes a sampling rate conversion function 116. The high-order application I/F unit 126 includes a sampling rate conversion function 130.

The high-order application I/F unit 113 stores the audio data output from the application program 111 to the sound queue 41 inside the shared memory between OSs 40. At this time, the sampling rate conversion function 116 of the high-order application I/F unit 113 performs conversion of the sampling rate and conversion of the quantization bit rate to the audio data received from the application program 111 as necessary. The high-order application I/F unit 113 stores the converted audio data to the sound queue 41 inside the shared memory between OSs 40.

The high-order application I/F unit 126 stores the audio data output from the sound server 124 and the application program 123 to the sound queues 42 and 43 inside the shared memory between OSs 40. At this time, the sampling rate conversion function 130 of the high-order application I/F unit 126 performs conversion of the sampling rate and conversion of the quantization bit rate to the audio data received from the sound server 124 and the application program 123. The high-order application I/F unit 126 stores the converted audio data to the sound queues 42 and 43 in the shared memory between OSs 40. The sampling rate conversion functions 116 and 130 convert, for example, 48 kHz 23-bit audio into 44.1 kHz 16-bit audio.

The driver core units 114 and 127 mix the audio data stored to each sound queue of the shared memory between OSs 40. The driver core units 114 and 127 transfer the audio data after the audio mixing process to the FIFO 131 of the I2S device 13 using the DMA transfer. Note that in this exemplary embodiment, a functional unit that is a part of the sound drivers 112 and 125 and performs the audio mixing process and control of the I2S device 13 and the I2C device 14 is defined as the driver core units 114 and 125. Further, the audio mixing process indicates a process that mixes the audio data output from the plurality of application programs operating on each OS and copies to a region for DMA transfer (the buffer for DMA transfer 44) as a single piece of the audio data.

In this exemplary embodiment, only the driver core unit of one OS (main system) among the plurality of OSs operates when the system is operating. The driver core unit of other OS (standby system) is usually in an idle state. The standby system operates only when the OS of the main system side has a kernel panic or freezes. Note that the main system indicates the system including the driver core unit that operates at normal time. The standby system indicates the system including the driver core unit that operates when the main system side is disabled. Here, the main system and the standby system are the main system and the standby system for the sound playing function (a partial function of the sound driver), and do not necessarily indicate the main system OS and the standby system OS. That is, the OS of the standby system side indicates the OS including a function as the standby system concerning the sound playing function.

A software mixer 128 is a function called by the driver core unit 127. The software mixer 128 mixes the audio data stored to each sound queue. The software mixer 128 stores the mixed audio data to the buffer for DMA transfer 44.

A common interrupt control unit 16 assigns an interrupt request (IRQ) to each CPU core. Basically, the common interrupt control unit 16 is included as a hardware function inside the MPU 10. Note that when the common interrupt control unit 16 is not mounted as the hardware function inside the MPU 10, it can be implemented as a software function.

The interrupt request input to the common interrupt control unit 16 is a DMA transfer completion interrupt issued by the DMAC 15 when the DMA transfer of the audio data is completed and the FIFO boundary interrupt issued by the I2S device 13. When there is no DMA transfer request within certain time since the generation of the DMA transfer completion interrupt, the buffer of the FIFO 131 of the I2S device 13 becomes empty and the I2S under-run error is generated.

The driver management unit 115 is a function group called by an interrupt handler of the OS of the standby system side. The driver management unit 115 performs setting of the HW timer 17, setting of ON/OFF of the FIFO boundary interrupt, and a switching process to switch the operation using the driver core unit of the main system to the operation using the driver core unit of the standby system. Note that the HW timer 17 indicates a hardware timer included in the MPU 10.

Next, an operation of the multicore system according to the exemplary embodiment of the present invention is explained.

After the DMA transfer is performed from the SDRAM 30 to the FIFO 131, the plurality of OSs 110 and 120 receive the DMA transfer completion interrupt. When the OS 120 of the main system side is normally operating, the received DMA transfer completion interrupt reaches a DMA transfer completion interrupt thread 129. Then, the DMA transfer completion interrupt thread 129 operates with the DMA transfer completion interrupt of the audio data as a trigger and performs the audio mixing process of the audio data and the DMA transfer request process. Then, the audio data after the audio mixing process that is stored to the buffer for DMA transfer 44 is DMA-transferred from the SDRAM 30 to the FIFO 131.

Note that in regard to the processing order of the audio mixing process and the DMA transfer start request process, one of the pattern A and the pattern B is selected according to the relationship between the audio mixing process time and the I2S under-run error in the OS 120 of the main system side.

When the selection condition "DMA transfer interval> (audio mixing process time×2)" is satisfied, the pattern A is selected. Then, in the pattern A, the processes are performed in the order that the DMA transfer start request process is performed following the audio mixing process. That is, in this case, in advance of the DMA transfer start request process, the audio mixing process is performed.

When the selection condition "DMA transfer interval≤audio mixing process time×2)" is satisfied, the pattern B is selected. Then, in the pattern B, the processes are performed in the order that audio mixing process is performed following the DMA transfer start request process. That is, in this case, in advance of the audio mixing process, the DMA transfer starting request process is performed. Further, in order to pre-read one packet (which is a DMA transfer size) of the audio data to perform the DMA transfer, a double buffering process of the audio is required.

Moreover, in this exemplary embodiment, when the selection condition "audio mixing process time<DMA transfer interval≤(audio mixing process time×2)" is satisfied, even when the selection condition "DMA transfer interval≤(audio mixing process time×2)" is satisfied, the pattern A is selected. Specifically, the selection condition of the pattern B is, precisely, "audio mixing process time≥DMA transfer interval" and also "DMA transfer interval≤(audio mixing process time×2)".

Next, a monitoring function of the OS 120 of the main system side of the multicore system according to the exemplary embodiment is explained. First, the case of selecting the pattern A and the case of selecting the pattern B when the selection condition "DMA transfer interval>(audio mixing process time×2)" is satisfied are explained.

In this case, when the OS 110 of the standby system side receives the DMA transfer completion interrupt, the driver management unit 115 that operates by the interrupt handler included in the OS 110 of the standby system side sets the HW timer 17. Then, when the DMA transfer completion interrupt reaches the DMA transfer completion interrupt thread 129 of the OS 120 of the main system side, the DMA transfer completion interrupt thread 129 cancels the setting the HW timer 17. Accordingly, when the DMA transfer completion interrupt does not reach the DMA transfer completion interrupt thread 129 of the OS 120 of the main system side, the setup HW timer 17 will not be cancelled and will time out. Therefore, it is possible to monitor disabled operation of the OS 120 of the main system side according to whether there is an existence of the time-out of the HW timer 17.

Next, the case of selecting the pattern A when the selection condition "audio mixing process time<DMA transfer interval≤(audio mixing process time×2)" is explained.

In this case, when the OS 110 of the standby system side receives the DMA transfer completion interrupt, the driver management unit 115 that operates by the interrupt handler included in the OS 110 of the standby system side allows the reception of the FIFO boundary interrupt by the I2S device 13. Further, when the OS 110 of the standby system side receives the FIFO boundary interrupt, the driver management unit 115 evaluates whether or not the number of samples of the audio data stored to the buffer for DMA transfer 44 reached a predetermined threshold. As a result of the evaluation, when the number of samples of the audio data has not reached the predetermined threshold calculated from the number of samples of the audio data stored to the FIFO 131, the driver management unit 115 performs the switching process that switches the operation using the driver core unit 127 of the main system to the operation using the driver core unit 114 of the standby system.

Here, the predetermined threshold is a reference value for evaluating whether the audio data of the number of samples that can complete the execution of remaining audio mixing process and DMA transfer request process is stored to the buffer for DMA transfer 44 until all the remaining audio data stored to the FIFO 131 is dequeued. That is, when the number of samples of the audio data stored to the buffer for DMA transfer 44 reaches the predetermined threshold, even when the remaining audio mixing process and DMA transfer request process are executed from that point, the I2C under-run error will not be generated.

The number of samples of the audio data stored to the FIFO 131 can be identified by, for example, referring to a register of the FIFO 131. Further, the size of the audio data dequeued from the FIFO 131 can be obtained from the number of times of the generation of the FIFO boundary interrupt. Furthermore, the number of samples of the audio data dequeued from the FIFO 131 can be obtained from the size. Therefore, the number of samples of the audio data stored to the FIFO 131 can be calculated from the number of times of the generation of the FIFO boundary interrupt.

Here, when the operation is switched to the driver core unit 114 of the standby system, the driver core unit 114 of the standby system side takes over and executes the audio mixing process which is performed part way through by the driver core unit 127 of the main system side. The driver core unit 114 of the standby system can identify the number of samples of the audio data mixed by the driver core unit 127 of the main system side referring to the number of samples of the audio data stored to the buffer for DMA transfer 44. Then, the audio data that is taken over to start mixing can be identified from the audio data stored to the sound queues 41, 42, and 43. Note that the number of samples of the audio data stored to the buffer for DMA transfer 44 may be able to be identified by the software mixer 128 storing the value to the shared memory between OSs 40 or may be able to be identified by counting the number of samples of the audio data stored to the buffer for DMA transfer 44.

Next, an example of the threshold is explained with reference to FIG. 4. FIG. 4 is a view showing a relationship between the number of times of the FIFO boundary interrupt and the thresholds.

FIG. 4 is a view showing an example of the threshold determined when the audio sampling frequency is about 48000 Hz, the I2S under-run error generation time is 1200 µs, the audio mixing process time is 700 µs, and the DMA transfer unit is 1024 samples, as an operation specifications of the multicore system 1. The value of about 48000 Hz is a frequency used by the audio output in an MPEG (Moving Picture Experts Group) video, etc. The FIFO 131 illustrates the case when the number of stages is 64 stages and 150 µs (1/48000 Hz≈18.75 µs to transmit one stage) is required to transmit data of eight stages. Here, the audio data of one sample is stored in one stage. Moreover, the size of the mixed audio data shall be four bytes. That is, it illustrates the case that whenever the audio data stored to the FIFO 131 decreases by 32 (four bytes×eight stages) bytes, the FIFO boundary interrupt is generated.

In FIG. 4, "the number of times of the FIFO boundary interrupt" indicates the number of times of the interrupt since the reception of the DMA transfer completion interrupt. Moreover, "the time when the FIFO boundary interrupt is generated" indicates the time since the reception of the DMA transfer completion interrupt. Note that the threshold can be calculated from the number of samples of the audio data stored to the FIFO 131 and the audio sampling frequency.

For example, when the seventh FIFO boundary interrupt is generated, the number of remaining samples of the FIFO 131 is eight samples. Accordingly, it can be calculated that there will be the I2S under-run error when 150 µs for transmitting eight samples elapses. Here, when an expected value is that the mixing of the audio data of the number of samples of the DMA transfer unit is completed with an allowance of 150 µs, at the time when the seventh boundary interrupt is generated, the audio data of 1024 samples needs to be stored to the buffer for DMA transfer 44. In this case, the threshold is set to "1024" as shown in FIG. 4.

The driver management unit 115 can identify the threshold by enabling reference to a formula that calculates the threshold from the number of the remaining samples of the FIFO 131 and the audio sampling frequency and a table that identifies the threshold from the number of the remaining samples of the FIFO 131 as shown in FIG. 4. This formula or table can be referred by the driver management unit 115 by being included in the driver management unit 115 and the shared memory between OSs 40.

Figure 5:
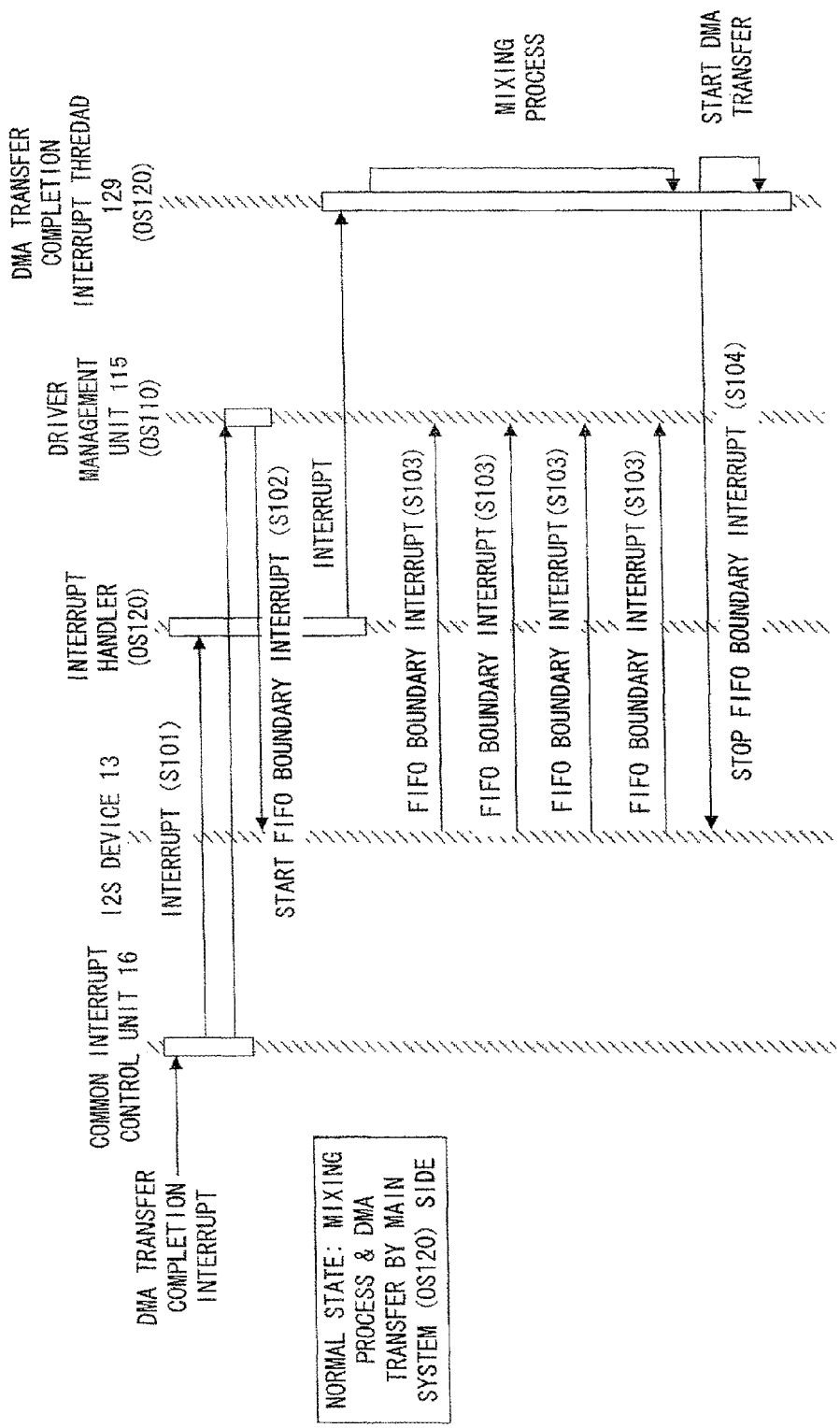
FIG. 5 is a sequence diagram for explaining an audio mixing process and a DMA transfer process in a state in which an OS of a main system side is normally operating according to the exemplary embodiment of the present invention.
Figure 6:
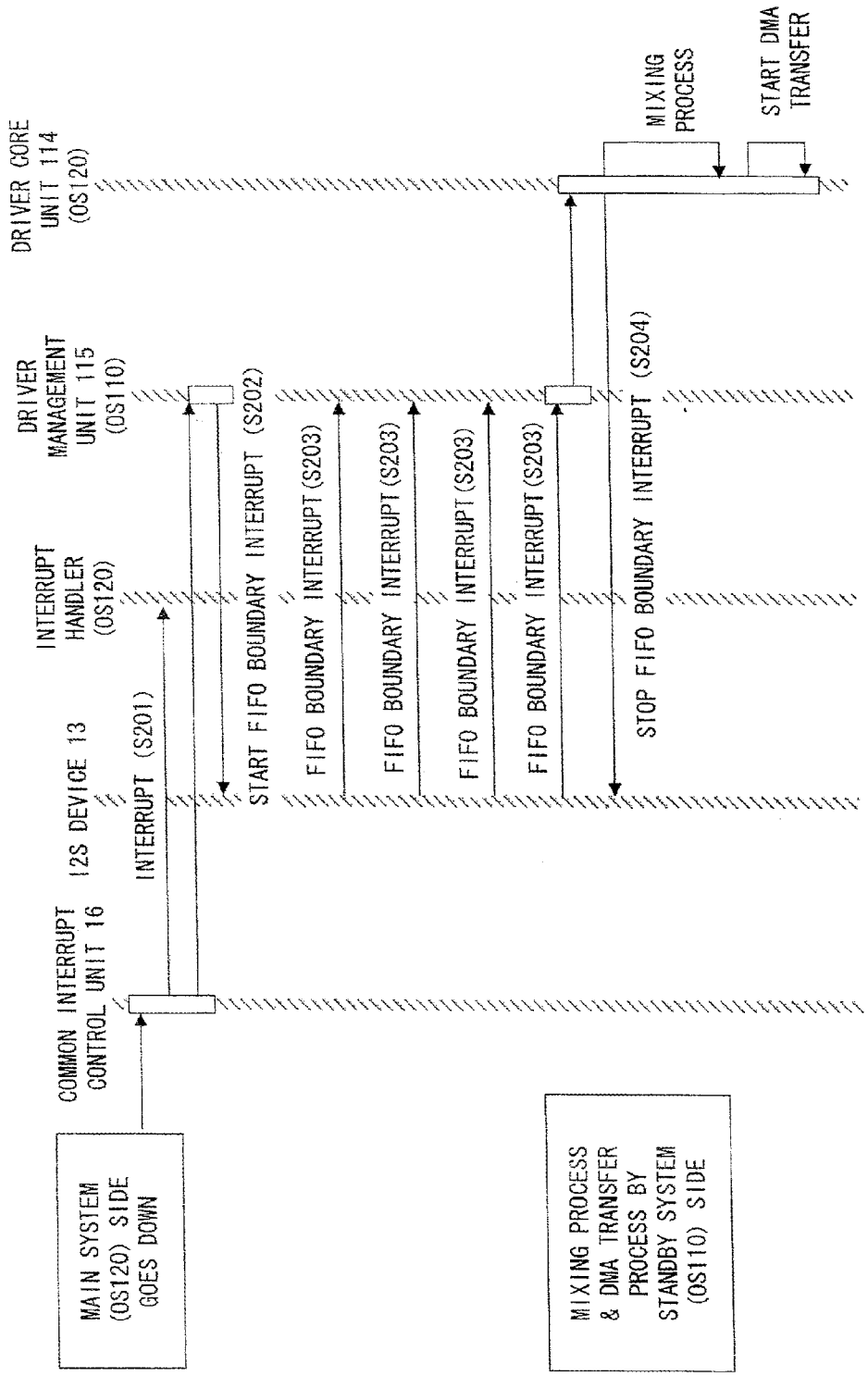
FIG. 6 is a sequence diagram for explaining the audio mixing process and the DMA transfer process in a state in which an OS of the main system side is disabled according to the exemplary embodiment of the present invention.

Next, the switching operation of the driver core unit when the disabled operation of the OS 120 of the main system side is detected is explained with reference to FIGS. 5 and 6. First, the process after the DMA transfer completion interrupt is received when the OS 120 of the main system side is normally operating is explained with reference to FIG. 5. FIG. 5 is a sequence diagram for explaining the audio mixing process and the DMA transfer process in the state in which the OS 120 of the main system side is normally operating. Note that although the FIFO boundary interrupt is output to the driver management unit 115 via the common interrupt control unit 16, as shown in FIG. 3, FIGS. 5 and 6 omit that point.

First, when the MPU 10 receives the DMA transfer completion interrupt, the common interrupt control unit 16 transmits the interrupt request (IRQ) to the plurality of CPU cores (S101).

Next, the driver management unit 115 that operates on the OS 110 of the standby system side outputs the FIFO boundary interrupt start request to the I2S device 13 when the interrupt request (IRQ) is received from the common interrupt control unit 16 (S102). In response to the output of the FIFO boundary interrupt start request, the I2S device 13 starts outputting the FIFO boundary interrupt.

Next, in response to the output of the FIFO boundary interrupt, the driver management unit 115 obtains the number of samples of the audio data stored to the buffer for DMA transfer 44. The driver management unit 115 evaluates whether or not the obtained number of samples reached the threshold (S103). When the number of samples reached the threshold, since the driver core 127 of the main system side normally operates and performs the audio mixing process, the driver management unit 115 will not switch the operation to the driver core unit 114 of the standby system.

Next, the driver core unit 127 of the main system side outputs the FIFO boundary interrupt stop request to the I2S device when the audio mixing process normally ended (S104). In response to the output of the FIFO boundary interrupt stop request, the I2S device 13 stops the output of the FIFO boundary interrupt.

Next, the process of continuing to perform the audio mixing process and the DMA transfer process using the OS of the standby system side when the OS 120 of the main system side is disabled is explained with reference to FIG. 6. FIG. 6 is a sequence diagram for explaining the audio mixing process and the DMA transfer process in the state in which the OS 120 of the main system side is disabled. Note that as the process of S201 and S202 shown in FIG. 6 is same as the process of S101 and S101 shown in FIG. 5, the explanation thereof is omitted here.

The driver management unit 115 obtains the number of samples of the audio data stored to the DMA transfer buffer in response to the output of the FIFO boundary interrupt. The driver management unit 115 evaluates whether or not the obtained number of samples reached the threshold (S203). Here, in FIG. 6, when the OS 120 of the main system side is disabled, the audio mixing process is not performed and the number of samples will not reach the threshold. Since the driver core unit 127 of the main system side does not normally operate when the number of samples has not reached the threshold, the driver management unit 115 switches the operation to the driver core unit 114 of the standby system. Specifically, the driver management unit 115 requests the driver core unit 114 of the standby system side to start the audio mixing process. Then, the driver core unit 114 of the standby system side starts the audio mixing process.

After the operation is switched, the driver core unit 114 of the standby system outputs the FIFO boundary interrupt stop request to the I2S device (S204). In response to the output of the FIFO boundary interrupt stop request, the I2S device 13 stops the output of the FIFO boundary interrupt. Then, the driver core unit 114 of the standby system takes over the audio mixing process of the audio data since when the OS 120 of the main system side is disabled.

Here, the process of taking over the audio mixing process of the audio data since when the OS 120 of the main system side is disabled is explained with reference to FIG. 7.

Figure 7:
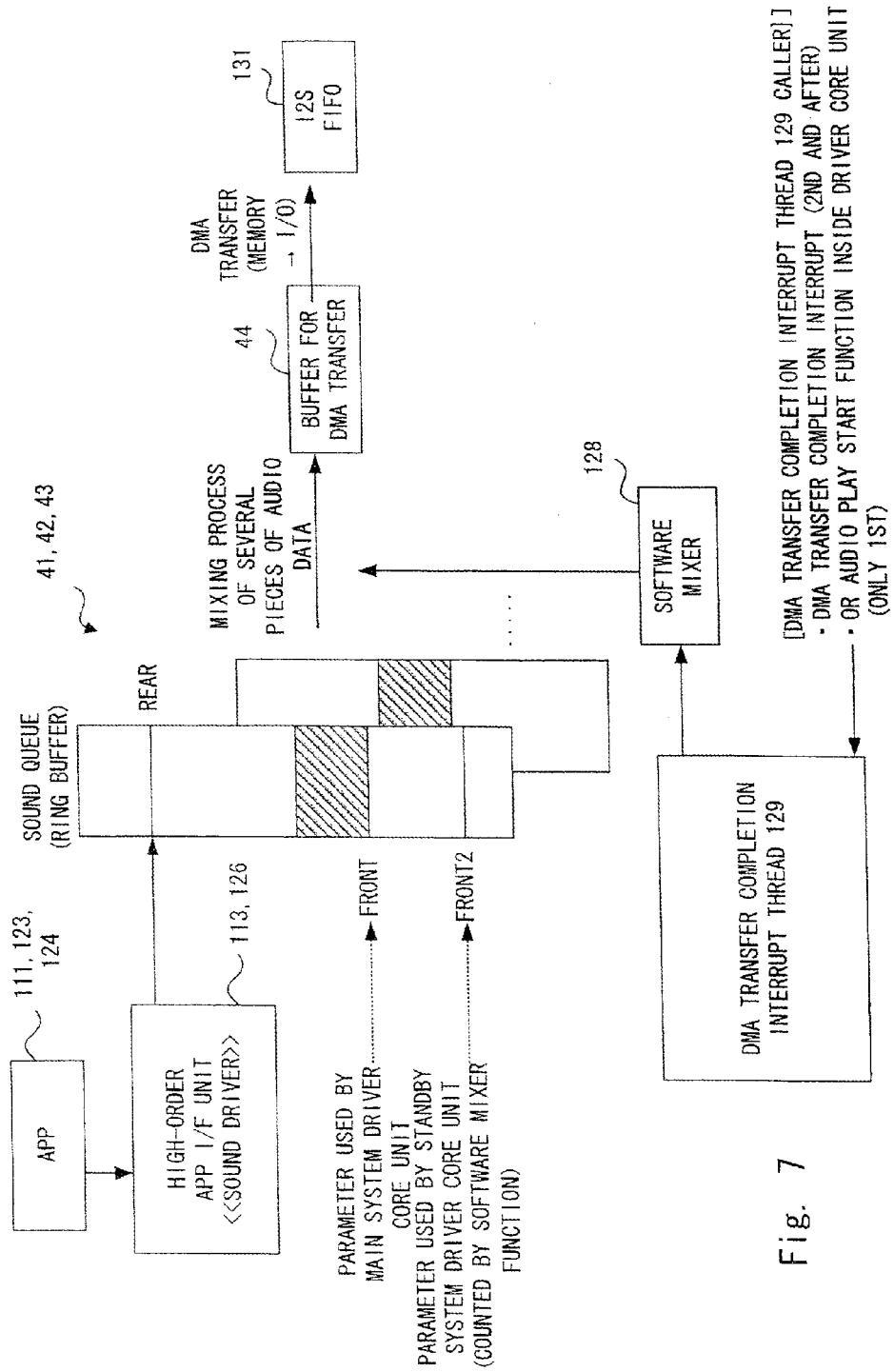
FIG. 7 is a view for explaining parameters concerning a sound queue according to the exemplary embodiment of the present invention.
Figure 8:
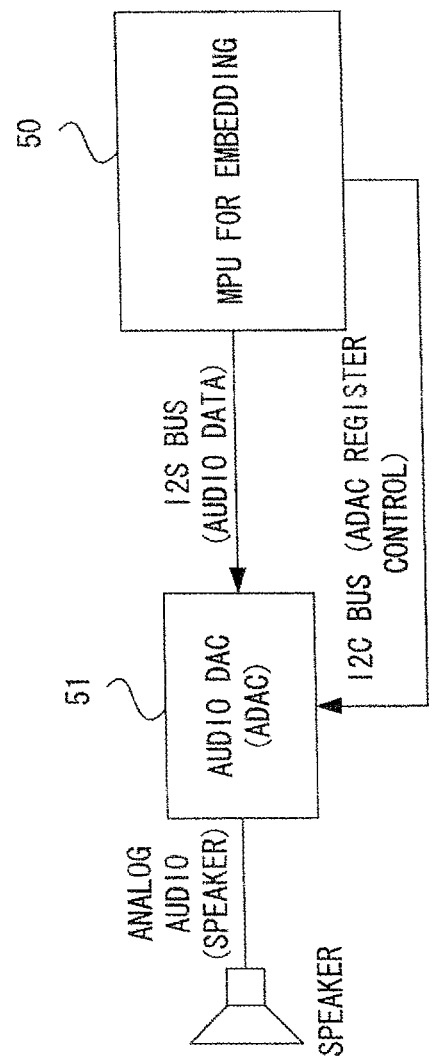
FIG. 8 is a view for explaining a technique related to the present invention.
Figures 9A, 9B:
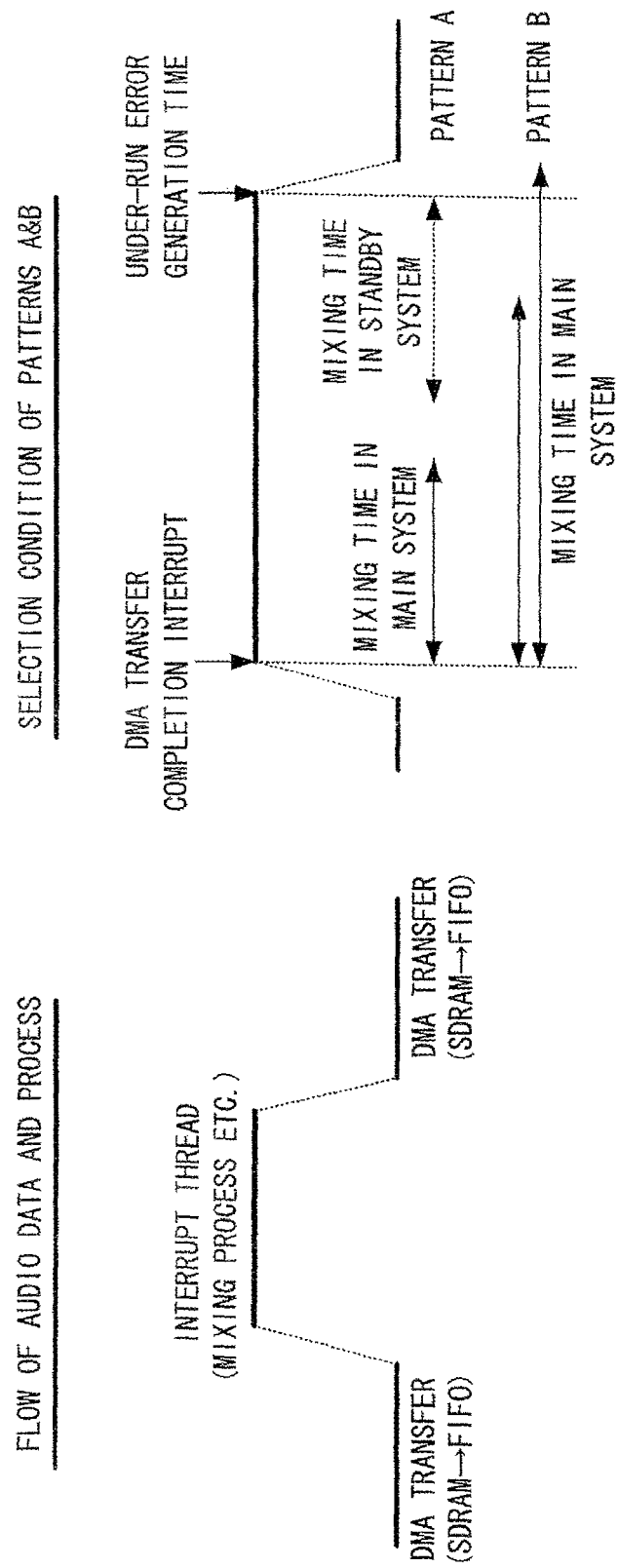
FIG. 9A is a view showing audio data and a flow of a process of the technique related to the present invention.
FIG. 9B is a view showing audio data and a flow of a process of the technique related to the present invention.
Figure 10:
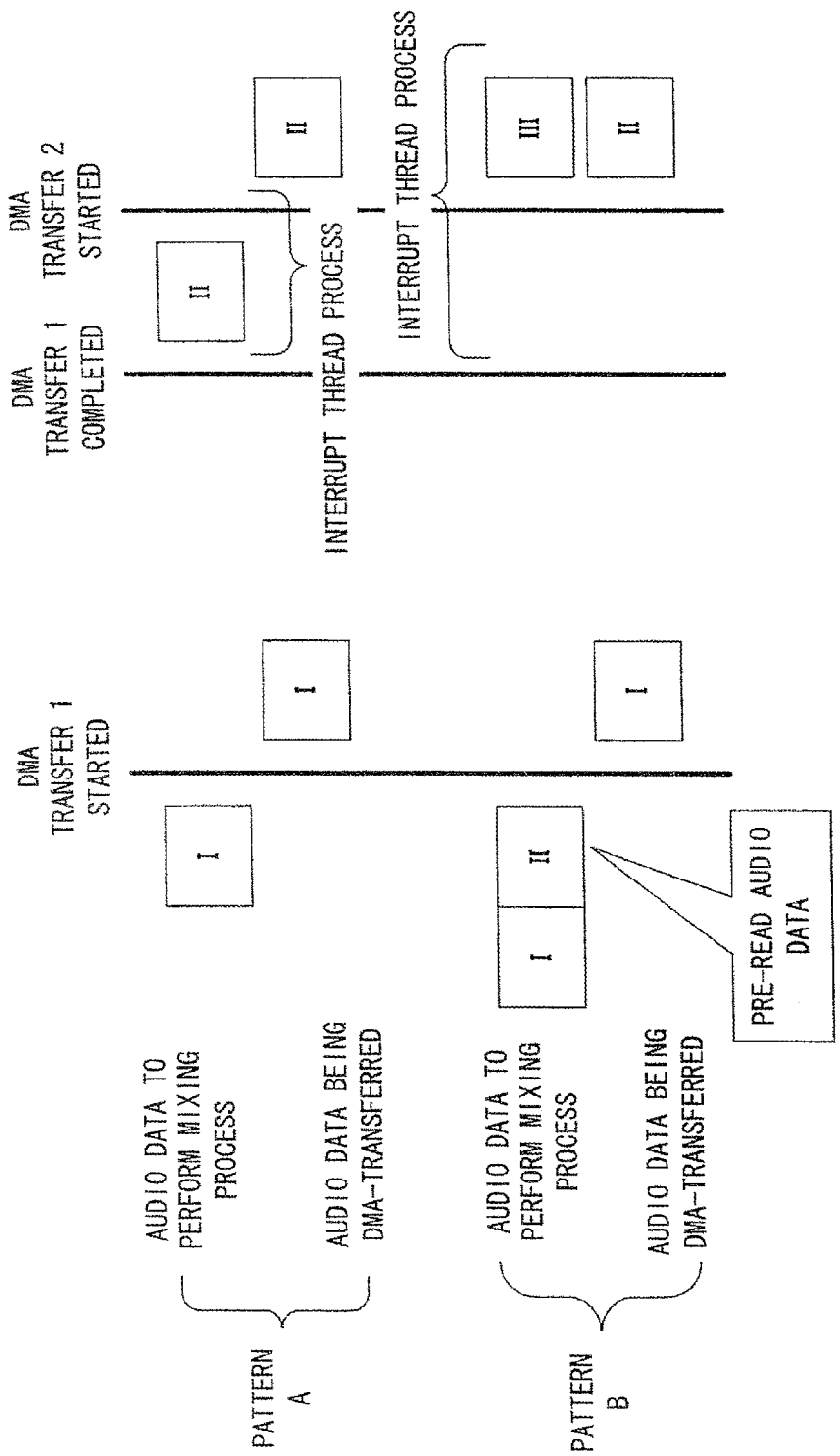
FIG. 10 is a view for explaining a processing method of the audio mixing process and a DMA transfer start request process of the technique related to the present invention.
Figure 11:
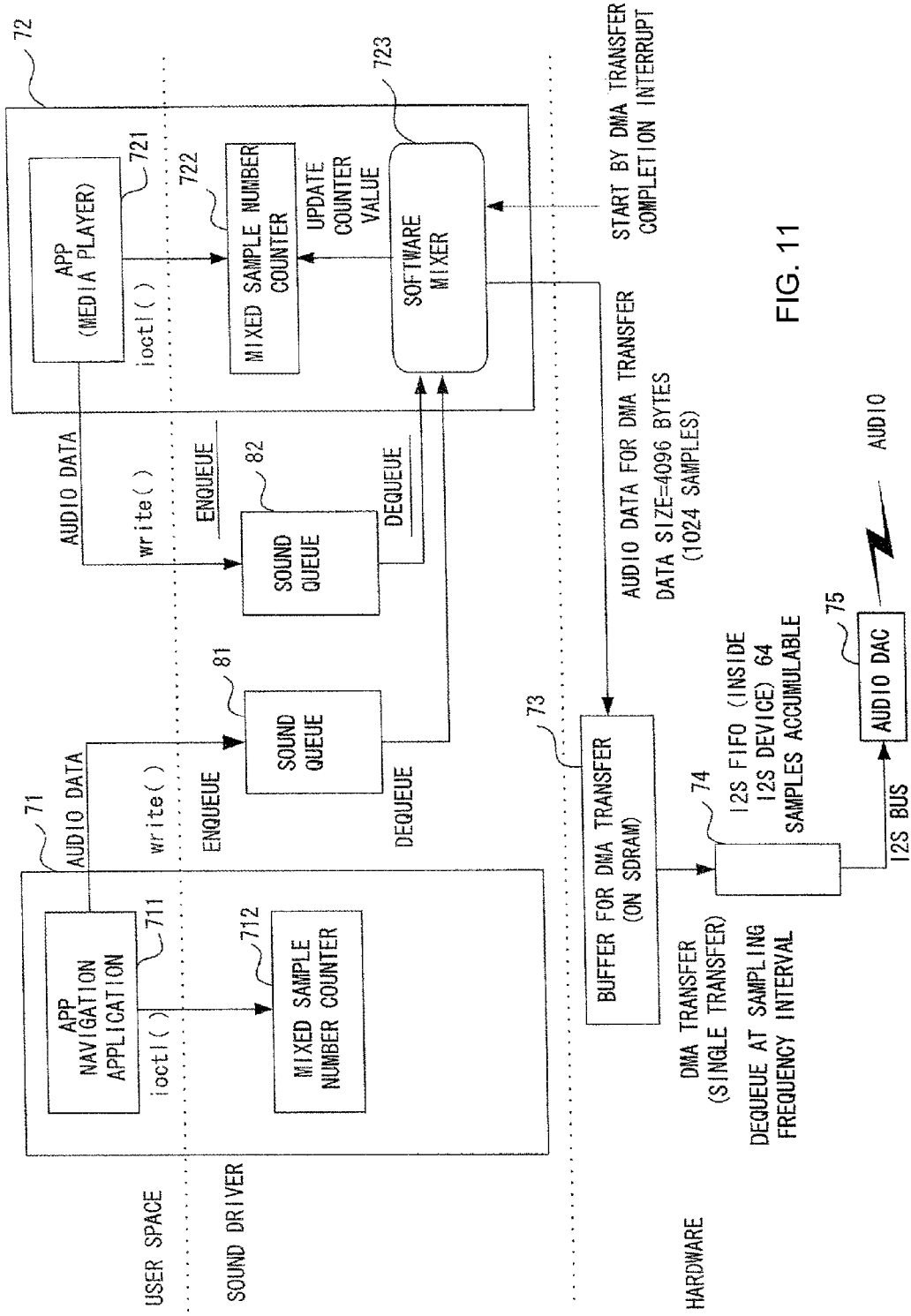
FIG. 11 is a view for explaining a problem that an accuracy of picture-sound synchronization of the technique related to the present invention.

As shown in FIG. 7, in this exemplary embodiment, a parameter front2 is added to each sound queue (ring buffer) in addition to parameters (front and rear) of a general ring buffer. Here, front is a parameter for dequeuing used by the driver core unit 127 of the main system side. Further, rear is a parameter for enqueuing used by high-order application I/F units 126 and 113 of each OS. Furthermore, front2 is a parameter for dequeuing used by the driver core unit 114 of the standby system side.

The parameter front2 is used to maintain the consistency of the audio data when the OS 120 of the main system side is disabled during the audio mixing process. For example, while the OS 110 of the standby system side is idling, after the DMA transfer start request, the driver core unit 127 of the main system side counts front2 for the number of times of the DMA transfer using the generation of the first full interrupt in the FIFO 131 of the I2S device 13 as a trigger. Note that the counting method of front2 is not limited to this, but a simpler method may be used. For example, it may be a configuration in which the DMA transfer completion interrupt thread of the main system side counts front2 at the exist of the thread. That is, full interrupt in the FIFO 131 of the I2S device 13 may be prohibited and performed.

When the OS 120 of the main system side is normally operating, the DMA transfer completion interrupt thread 129 dequeues the audio data (the sections indicated as shaded in FIG. 7) from the position indicated by front. This dequeuing process is counted using front. That is, front is counted for the number of samples of the dequeued audio data every time the audio data is dequeued. Next, the driver core unit 127 of the main system side performs the audio mixing process of a plurality of pieces of audio data output from the sound queue using a called software mixer function. Subsequently, the audio data after the audio mixing process that is stored to the buffer for DMA transfer 44 is DMA-transferred from the SDRAM 30 to the FIFO 131 of the I2S device 13. Here, this number of times of the DMA transfer is counted using front2. That is, front2 is counted for the number of samples of the DMA-transferred audio data whenever the DMA transfer is performed.

Accordingly, when the OS 120 of the main system side normally operates, front2 follows front and changes after front starts from the same position as front2. On the other hand, when the OS 120 of the main system side is disabled, dequeuing of the audio data stops on the way and counting of front stops. Additionally, since the DMA transfer will not be performed by the OS 120 of the main system side becoming disabled, counting of front2 stops and the position of front2 will not be updated.

Here, as shown in FIG. 7, a situation is assumed in which when the OS 120 of the main system side is disabled and front and front2 stop, the driver core unit 114 of the switched standby system side starts dequeuing the audio data from the position indicated by front using the called software mixer function. In this situation, when dequeuing of the audio data is started from the position indicated using front, the audio data that is possibly missing will be dequeued, and the consistency of the audio data cannot be guaranteed. Therefore, when the OS 120 of the main system side is disabled and front and front2 stop, the driver core unit 114 of the switched standby system side starts dequeuing the audio data from the position indicated by front2 using the called software mixer function. Then, as dequeuing can be started from the audio data before the OS 120 of the main system side is disabled, the consistency of the audio data before and after switching can be guaranteed.

Here, when the selection condition "audio mixing process time<DMA transfer interval≤(audio mixing process time× 2)" is satisfied and the pattern A is selected, front2 is counted for the number of samples of the audio data stored to the buffer for DMA transfer 44 minus one with reference to the buffer for DMA transfer 44. Then, dequeuing of the audio data is started from the position indicated by front2.

Here, the audio data that is possibly missing among the audio data stored to the buffer for DMA transfer 44 will be the audio data that is audio-mixed and stored at the end by the driver core unit 127 of the main system side. Accordingly, as described above, in the driver core unit 114 of the standby system side, by taking over and executing the audio mixing process from the audio data that is audio-mixed and stored at the end by the driver core unit 127 of the main system side, the consistency of the audio data before and after switching can be guaranteed. That is, the driver core unit 114 of the standby system side takes over and executes the audio mixing process from the position at least one sample before the position indicated by the amount of storage of the audio data stored to the buffer for DMA transfer 44 among the positions of the sound queues 41, 42, and 43.

Further, as described above, by the driver core unit 114 of the standby system side taking over and executing the audio mixing process, the audio mixing process time through before and after switching from the main system side to the standby system side can be almost one audio mixing process time. Therefore, even when the pattern A is selected in the case of satisfying the condition of "audio mixing process time<DMA transfer interval≤(audio mixing process time×2)", it is possible to switch from the main system side to the standby system without generating the I2S under-run error.

In addition, when it is switched to the OS 110 of the standby system side, while the driver core unit 114 of the standby system side, which is currently the main system side, is performing the audio mixing process, by prohibiting DMA register accesses from the driver core unit 127, which has previously been the main system side, the consistency of the audio data is guaranteed. For example, the driver management unit 110 of the standby system side temporarily changes base addresses of the peripheral devices (I2S device 13 and the DMAC 15) on the shared memory (SDRAM 30) recognized by the OS 120 of the main system side to an invalid address such as a unused space on the SDRAM 30. Then, it is possible to prohibit accesses by the OS 120, which has been the main system before being switched, to the register.

According to this exemplary embodiment explained so far, in a configuration to share the I2S bus for audio output between the plurality of OSs, even when the operation of one OS stops, it is possible to prevent the audio output from the other OS side from being interrupted. At this time, even when "audio mixing process time<DMA transfer interval≤(audio mixing process time×2)" is satisfied, it is made possible to switch from the main system to the standby system by the pattern A that does not decrease the accuracy of the picture-sound synchronization. Therefore, it is possible to prevent from generating the sound skipping while suppressing the decrease of the accuracy of the picture-sound synchronization.

Further, according to this exemplary embodiment, the evaluation of whether or not switching from the main system to the standby system is required when the standby system receives the FIFO boundary interrupt can be possible only by referring to the number of samples of the audio data stored to the shared memory between OSs. Therefore, the processing speed will not be reduced.

Moreover in this exemplary embodiment, the period that allows the FIFO boundary interrupt is a period of several hundreds μs orders among DMA transfer cycle for each several dozen ms. Therefore, there is extremely small influence on the performance of the standby system side.

Moreover, in this exemplary embodiment, the sound driver is divided into the high-order application I/F unit and the driver core unit, and the sampling rate conversion function is included in the high-order application I/F unit. Accordingly, even when only the driver core unit of the main system side is disabled, the sampling rate conversion process in the high-order application I/F unit of the main system can be continued. Therefore, it is possible to continue and play the audio data generated by the OS of the main system side by switching the execution of the audio mixing process to the driver core unit of the standby system.

Note that the present invention is not limited to the above exemplary embodiment but can be modified as appropriate within the scope of the present invention. For example, although the case in which the MPU 10 includes two OSs 110 and 120 is explained as an example, the present invention is not limited to this. Specifically, the MPU 10 may include three or more OSs. In this case, there are a plurality of OSs of the standby system side.

A program that executes the operations in the abovementioned main system and the standby system can be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), CD-ROM (compact disc read only memory), CD-R (compact disc recordable), CD-R/W (compact disc rewritable), and semiconductor memories (such as mask ROM, PROM (programmable ROM), EPROM (erasable PROM), flash ROM, RAM (random access memory), etc.). The program may be provided to a computer using any type of transitory computer readable media. Examples of transitory computer readable media include electric signals, optical signals, and electromagnetic waves. Transitory computer readable media can provide the program to a computer via a wired communication line (e.g. electric wires, and optical fibers) or a wireless communication line.

The present application claims priority rights of and is based on Japanese Patent Application No. 2009-262545 filed on Nov. 18, 2009 in the Japanese Patent Office, the entire contents of which are hereby incorporated by reference.

REFERENCE SIGNS LIST

1 MULTICORE SYSTEM
10 AND 50 MPU
11 AND 12 CPU
13 I2S DEVICE
14 I2C DEVICE
15 DMA CONTROLLER
16 COMMON INTERRUPT CONTROL UNIT
17 HW TIMER
20 AUDIO OUTPUT DEVICE
21 AND 51 ADAC&
22 SPEAKER
30 SRAM
40 SHARED MEMORY BETWEEN OSs
41, 42, 43, 81, AND 82 SOUND QUEUE
44, 63, AND 73 BUFFER FOR DMA TRANSFER
61 AND 62 PROCESSOR CORE
64 AUDIO OUTPUT UNIT
71, 72, 110, AND 120 OS
74 AND 131 FIFO
75 ADAC
111, 121, 122, 123, 711, AND 721 APPLICATION
112, 125 SOUND DRIVER
113, 126 HIGH-ORDER APPLICATION I/F UNIT
114, 127 DRIVER CORE UNIT
115 DRIVER MANAGEMENT UNIT
116 and 130 SAMPLING RATE CONVERSION FUNCTION
124 SOUND SERVER
128 SOFTWARE MIXER
129 DMA TRANSFER INTERRUPT THREAD
610 AND 620 PROGRAM
712 AND 722 MIXED SAMPLE NUMBER COUNTER

The invention claimed is:

1. A multicore system comprising:
a main system program that operates on a first processor core, mixes first and second audio data to create synthesized audio data, and stores the synthesized audio data to a buffer for DMA transfer;
a standby system program that operates on a second processor core and operates as a standby system of the main system program; and
an audio output unit that sequentially stores the synthesized audio data transferred from the buffer for DMA transfer and plays the stored synthesized audio data,
wherein when an amount of storage of the synthesized audio data stored to the buffer for DMA transfer has not reached a predetermined amount of data determined according to the amount of storage of the synthesized audio data stored to the audio output unit, the standby system program takes over and executes the mixing and the storage of the synthesized audio data executed by the main system program.

2. The multicore system according to claim 1, wherein the standby system program evaluates whether or not the amount of storage of the synthesized audio data stored to the buffer for DMA transfer reaches a predetermined threshold determined according to an amount of decrease of the synthesized audio data stored to the audio output unit every time the amount of storage of the synthesized audio data stored to the audio output unit decreases by a predetermined unit, and when the predetermined threshold is not reached, takes over and executes the mixing and the storage of the synthesized audio data executed by the main system program.

3. The multicore system according to claim 1, wherein the audio output unit includes a FIFO buffer that enqueues the synthesized audio data transferred from the buffer for DMA transfer and the synthesized audio data to be played is dequeued therefrom.

4. The multicore system according to claim 3, wherein
the audio output unit outputs a FIFO boundary interrupt to the standby system program every time the synthesized audio data stored to the FIFO buffer is dequeued by a predetermined unit, and
the standby system program evaluates whether or not the amount of storage of the synthesized audio data stored to the buffer for DMA transfer reaches a predetermined threshold determined according to the amount of storage of the synthesized audio data stored to the FIFO buffer, and when the predetermined threshold is not reached, takes over and executes the mixing and the storage of the synthesized audio data executed by the main system program.

5. The multicore system according to claim 4, further comprising a DMA controller that transfers the synthetic audio data stored to the buffer for DMA transfer to the FIFO buffer and when the transfer is completed, outputs a DMA transfer completion interrupt to the standby system program, wherein
the standby system program outputs a FIFO boundary interrupt start request that enables an output of the FIFO boundary interrupt according to the DMA transfer completion interrupt from the DMA controller to the audio output unit, and
when the mixing and the storage of the synthesized audio data is completed, the main system program outputs a FIFO boundary interrupt stop request that disables the output of the FIFO boundary interrupt to the audio output unit.

6. The multicore system according to claim 1, wherein
the main system program includes a first operating system and a first sound driver that operates on the first operating system,
the standby system program includes a second operating system and a second sound driver that operates on the second operating system, and
the second sound driver takes over and executes the mixing and the storage of the synthesized audio data executed by the first sound driver.

7. The multicore system according to claim 6, further comprising a first ring buffer that stores the first audio data and a second ring buffer that stores the second audio data, wherein the sound driver of the main system program sequentially obtains the first and the second audio data from the first and the second ring buffers, and when taking over and executing the mixing and the storage of the synthesized audio data, the second sound driver takes over and executes the mixing and the storage of the first and the second audio data from a position at least one sample before than a position indicated by the amount of storage of the synthesized audio data stored to the DMA buffer among positions of the first and the second ring buffers.

8. The multicore system according to claim 7, wherein
the main system program further includes a first application program that generates the first audio data,
the standby system program further includes a second application program that generates the second audio data,
the first sound driver includes an interface unit that converts a sampling rate of the first audio data generated by the first application program and stores it to the first ring buffer and a driver core unit that executes the mixing and the storage of the synthesized audio data,
the second sound driver includes an interface unit that converts a sampling rate of the second audio data generated by the second application program and stores it to the second ring buffer and a driver core unit that executes the mixing and the storage of the synthesized audio data.

9. The multicore system according to claim 1, wherein
the audio output unit includes an I2S device and an audio output device including a DA converter,
the I2S device includes a FIFO buffer that enqueues the synthesized audio data transferred from the buffer for DMA transfer and the synthesized audio data to be played is dequeued therefrom, and
the audio output device converts the synthesized audio data dequeued from the FIFO buffer into an analog signal and plays it.

10. The multicore system according to claim 2, wherein
the main system program includes a first operating system and a first sound driver that operates on the first operating system,
the standby system program includes a second operating system and a second sound driver that operates on the second operating system, and
the second sound driver takes over and executes the mixing and the storage of the synthesized audio data executed by the first sound driver.

11. The multicore system according to claim 3, wherein
the main system program includes a first operating system and a first sound driver that operates on the first operating system,
the standby system program includes a second operating system and a second sound driver that operates on the second operating system, and
the second sound driver takes over and executes the mixing and the storage of the synthesized audio data executed by the first sound driver.

12. The multicore system according to claim 4, wherein
the main system program includes a first operating system and a first sound driver that operates on the first operating system,
the standby system program includes a second operating system and a second sound driver that operates on the second operating system, and
the second sound driver takes over and executes the mixing and the storage of the synthesized audio data executed by the first sound driver.

13. The multicore system according to claim 5, wherein
the main system program includes a first operating system and a first sound driver that operates on the first operating system,
the standby system program includes a second operating system and a second sound driver that operates on the second operating system, and
the second sound driver takes over and executes the mixing and the storage of the synthesized audio data executed by the first sound driver.

14. A control method of a multicore system comprising:
mixing, by a main system program that operates on a first processor core, first and second audio data to create synthesized audio data, and storing the synthesized audio data to a buffer for DMA transfer;
sequentially storing, by an audio output means, the synthesized audio data transferred from the buffer for DMA transfer and playing the stored synthesized audio data;
evaluating, by a standby system program that operates on a second processor core and operates as a standby system of the main system program, whether or not an amount of storage of the synthesized audio data stored to the buffer for DMA transfer reaches a predetermined amount of data determined according to the amount of storage of the synthesized audio data stored to the audio output means; and
when it is evaluated that the predetermined amount of data is reached, taking over and executing, by the standby system program, the mixing and the storage of the synthesized audio data executed by the main system program.

15. A non-transitory readable medium storing a program that operates as a standby system of a main system program on a processor core that is different from the main system program and causes the processor core to execute:
a process for evaluating whether an amount of storage of synthesized audio data that is stored to a buffer for DMA transfer reaches a predetermined amount of data determined according to an amount of storage of the synthesized audio data stored to an audio output means, the synthesized audio data being transferred to an audio output means and being obtained by the main system program mixing first and second audio data, the audio output means sequentially storing the synthesized audio data that is transferred and playing the stored synthesized data, and the buffer for DMA transfer storing the synthesized audio data; and
a process for taking over and executing the mixing and the storage of the synthesized audio data executed by the main system program when it is evaluated that the predetermined amount of data is reached.

* * * * *